(12) United States Patent
Redfern et al.

(10) Patent No.: US 10,249,006 B2
(45) Date of Patent: Apr. 2, 2019

(54) PROVIDING SOCIAL CONTEXT TO CALENDAR EVENTS

(71) Applicant: Microsoft Technology Licensing, LLC, Redmond, WA (US)

(72) Inventors: Jonathan Redfern, Truckee, CA (US); Manish Mohan Sharma, San Jose, CA (US); Kiran Prasad, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 13/673,473

(22) Filed: Nov. 9, 2012

(65) Prior Publication Data

US 2014/0136612 A1  May 15, 2014

(51) Int. Cl.
| | | |
|---|---|---|
| G06F 15/16 | (2006.01) | |
| G06Q 50/00 | (2012.01) | |
| H04L 29/08 | (2006.01) | |
| G06F 15/173 | (2006.01) | |

(52) U.S. Cl.
CPC ........... G06Q 50/01 (2013.01); G06F 15/173 (2013.01); G06Q 50/00 (2013.01); H04L 29/08 (2013.01); H04L 67/306 (2013.01)

(58) Field of Classification Search
CPC ..... H04L 67/306; G06F 15/21; G06F 15/173; G06Q 50/01
USPC ................................................. 709/204, 203
See application file for complete search history.

(56) References Cited

U.S. PATENT DOCUMENTS

| | | | | |
|---|---|---|---|---|
| 8,155,630 | B2 * | 4/2012 | Scott et al. | 455/414.1 |
| 8,606,242 | B2 * | 12/2013 | Kedefors et al. | 455/414.1 |
| 8,712,387 | B2 * | 4/2014 | Kedefors et al. | 455/414.1 |
| 8,810,392 | B1 * | 8/2014 | Teller | G08B 21/24 |
| | | | | 235/385 |
| 2007/0249410 | A1 * | 10/2007 | Patel et al. | 455/567 |
| 2010/0190474 | A1 * | 7/2010 | Rajguru | 455/412.1 |
| 2010/0217645 | A1 * | 8/2010 | Jin et al. | 705/9 |
| 2010/0222033 | A1 * | 9/2010 | Scott | H04M 3/5322 |
| | | | | 455/414.1 |
| 2011/0205850 | A1 * | 8/2011 | Annambhotla et al. | 368/14 |
| 2012/0290977 | A1 * | 11/2012 | Devecka | H04W 4/206 |
| | | | | 715/810 |
| 2013/0117181 | A1 * | 5/2013 | Isaacson et al. | 705/41 |
| 2013/0325978 | A1 * | 12/2013 | Mansfield et al. | 709/206 |
| 2014/0074952 | A1 * | 3/2014 | White et al. | 709/206 |

(Continued)

*Primary Examiner* — Joseph E Avellino
*Assistant Examiner* — Rachel J Hackenberg
(74) *Attorney, Agent, or Firm* — Schwegman Lundberg & Woessner, P.A.

(57) ABSTRACT

A mobile communication device includes an application program interface and a computer processor configured with a calendar application and calendar database. The computer processor and/or application programming interface are configured to identify an event in the calendar database that is associated with a first person, and transmit a request to a social network server and/or a business network server. The request includes an identification of the first person and a user of the mobile communication device. The computer processor and/or application programming interface is further configured to receive from the social network server and/or the business network server information relating to the first person and the user of the mobile communication device.

21 Claims, 11 Drawing Sheets

(56) References Cited

U.S. PATENT DOCUMENTS

2014/0077944 A1* 3/2014 Baskin et al. ............. 340/539.1
2014/0181209 A1* 6/2014 Tseng ........................... 709/204

* cited by examiner

12:30 Lunch w/ Sathvik Tantry

1005 — Crossroads Cafe

1010 — Sathvik, Tantry
Owner, Kanjoh

1015 — Autonomy, Mastery, and Purpose http://theresmoney everywhere.com/autonomy-mastery-and-purpose/ Jan 7

Sathvik Tantry RT @skooloflife: RT @probblogger. I enjoy my work too much to aim for a 4 hour work week. (me too) Jan 6

Autonomy, Mastery, and Purpose http://theresmoney everywhere.com/autonomy-mastery-and-purpose/ Jan 6

1020 — Sathvik Tantry messaged you Re: StartupDigest: "The Chile Edition" Jan 4

Sathvik Tantry attended Brunch w/ Sathvik Tantry at Orson Dec 4, 2010

1025 — sathvik.tantry@gmail.com
650 - 804 - 1573 mobile

1030 — Andrew V. Ly, Luis Chia, Ada Chen Rekhi, Ryan Hayward, Sandio Saha, Shehzad Daredia, Jonathan Tzou, Chandresh Ladva
18 more

PROVIDING SOCIAL CONTEXT TO CALENDAR EVENTS

TECHNICAL FIELD

The present disclosure generally relates to data processing systems. Specifically, the present disclosure relates to methods, systems and computer storage devices for providing social context to calendar events, and more specifically, but not by way of limitation, to an application program interface that couples a calendar application on a mobile communication device with a social network system and/or a business network system.

BACKGROUND

Mobile communication devices are ubiquitous and are carried by the vast majority of people today and virtually all people in business. These mobile communication devices of course permit the user to make and receive telephone calls over a cellular telephone network, and also provide other functions ranging from internet access, to text messaging, to photographic and video functionality. Some mobile communication devices also include an integral calendar function and database, which permits the user to keep track of meetings, events, and appointments. In connection with or separate from such calendar functions, an address book provides general contact information and event information such as meeting information. Contact information can include a person's name, e-mail address, phone number, and location information for work and home. Event details may include a title or subject of a meeting, a time, and a location. Yet neither a calendar nor an address book presents a cohesive picture when the user of the mobile device is preparing for a meeting. It can be left to the user to search through previous communications and historical calendar pages to collect an idea of recent communication and interaction with a contact they will interact with in an upcoming meeting, and/or to find out some information about that contact, and/or the subject of the meeting. The user faces a daunting task of trying to find out any information about this person before the upcoming meeting.

BRIEF DESCRIPTION OF THE DRAWINGS

Some embodiments are illustrated by way of example and not limitation in the FIG's of the accompanying drawings, in which.

DETAILED DESCRIPTION

Figure 1:
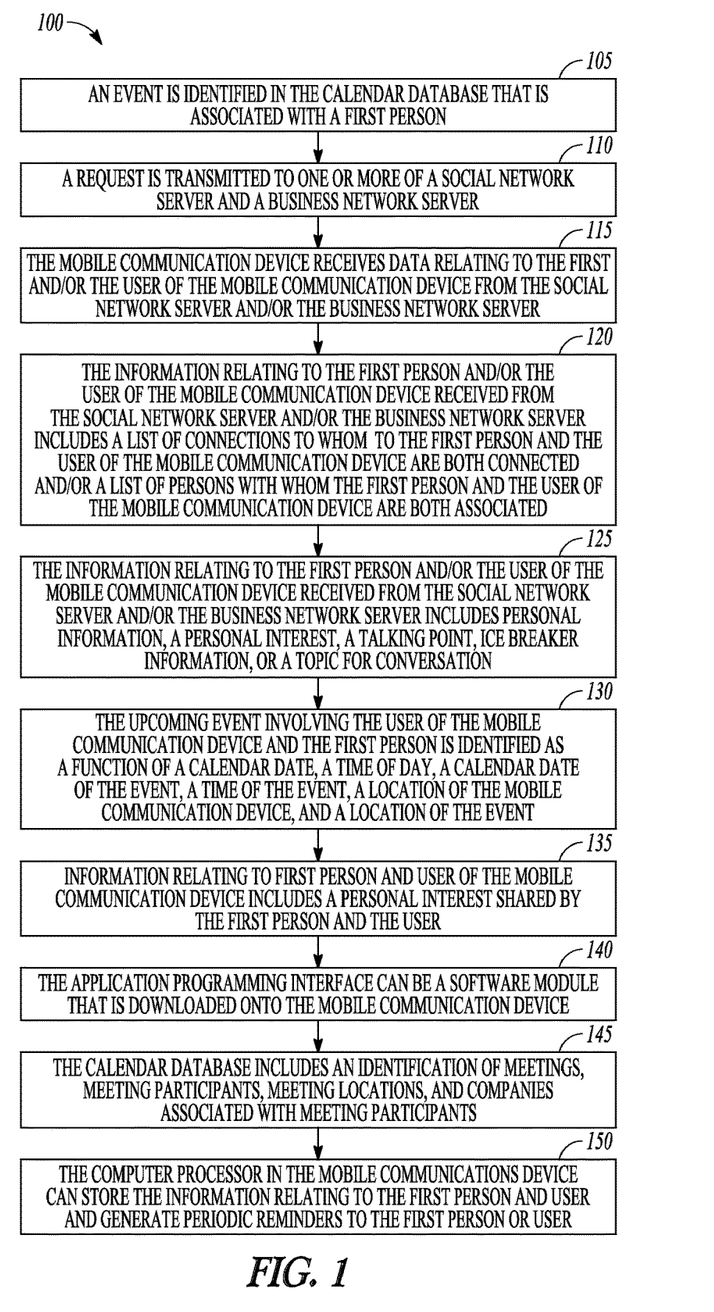
FIG. 1 is a block diagram of a flowchart-like diagram that illustrates an example embodiment of features of providing social context to calendar events and a process to provide social context to calendar events.
Figure 2A:
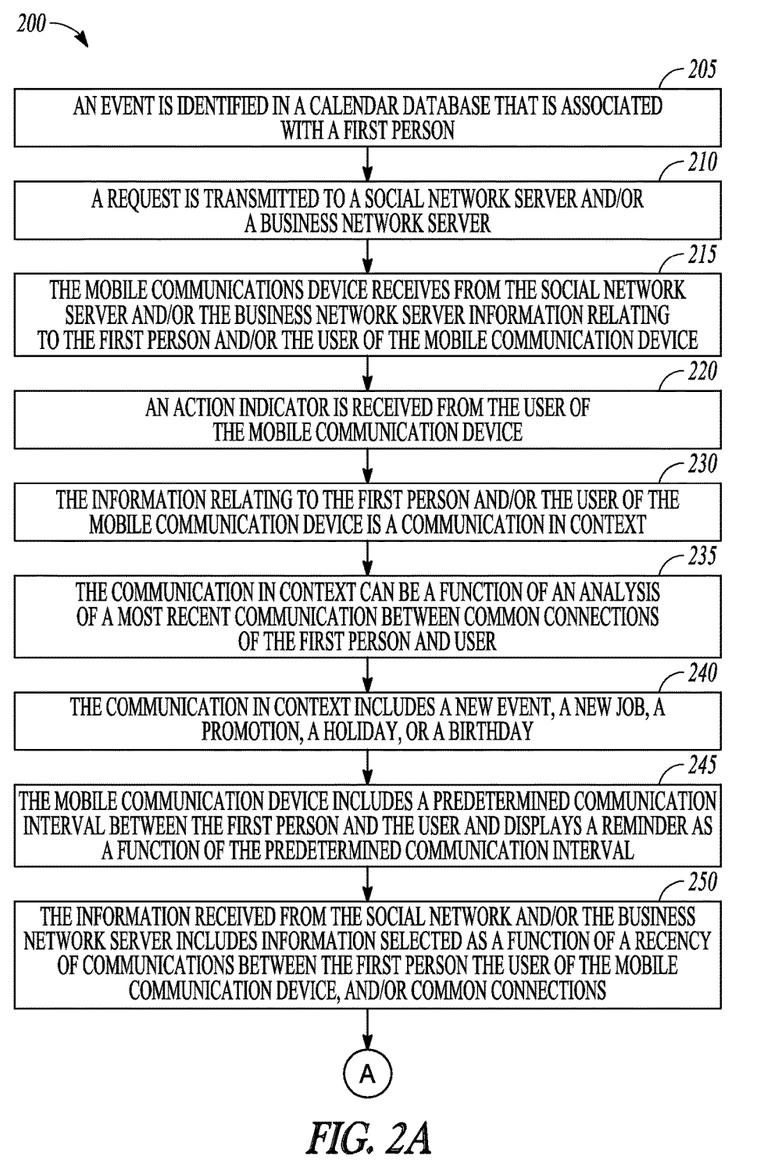
FIGS. 2A and 2B are a block diagram of a flowchart-like diagram that illustrates another example embodiment of features of providing social context to calendar events and a process to provide social context to calendar events.
Figure 2B:
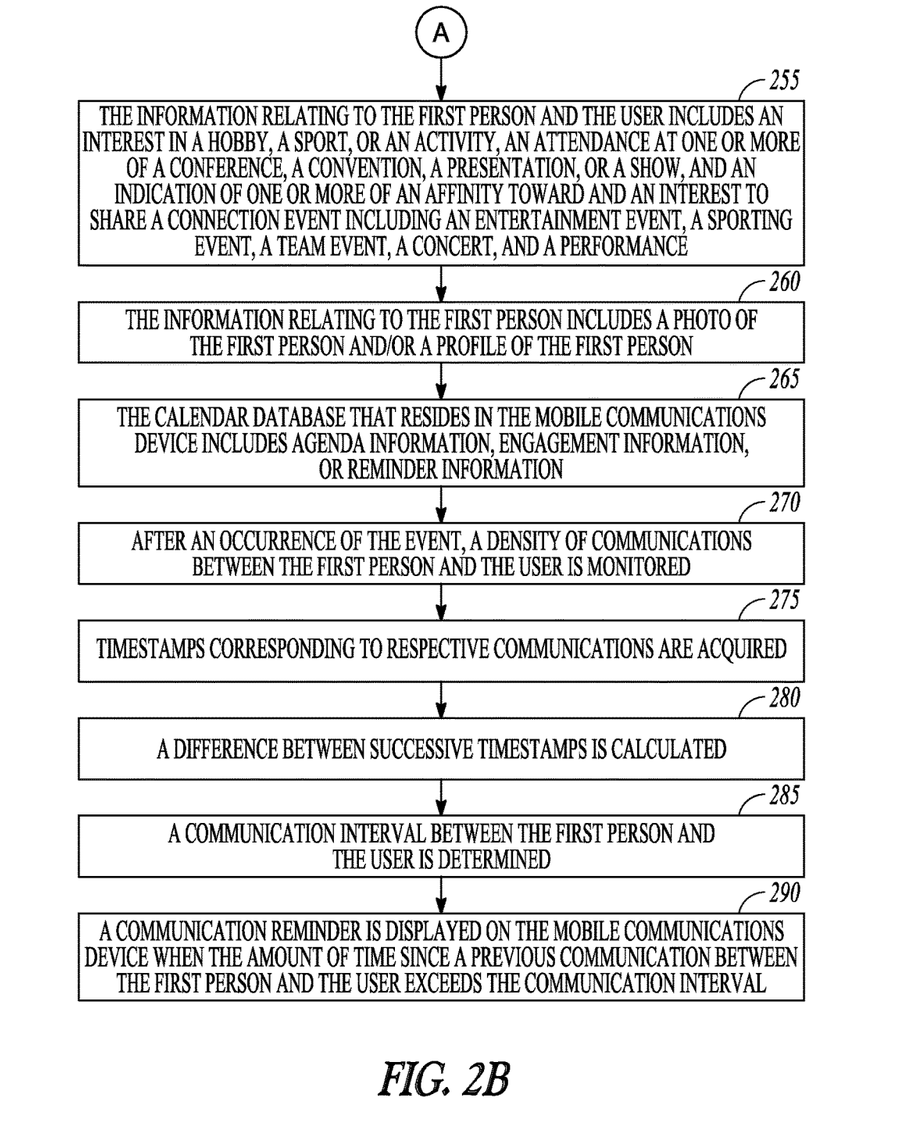

The present disclosure describes methods, systems, and computer storage devices for providing social context to calendar events. In the following description, for purposes of explanation, numerous specific details are set forth in order to provide a thorough understanding of the various aspects of different embodiments of the present invention. It will be evident, however, to one skilled in the art, that the present invention may be practiced without all of the specific details.
Systems and Methods FIGS. 1, 2A, and 2B are flowchart-like diagrams of features and example processes 100 and 200 for providing social context to calendar events, and in particular, providing social context from a social or business networking system to a calendar system, wherein the calendar system resides on a mobile communications device. FIG. 1 includes a number of process blocks 105-150, and FIGS. 2A and 2B include a number of process blocks 205-290. Though arranged serially in the examples of FIGS. 1, 2A, and 2B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Figure 3A:
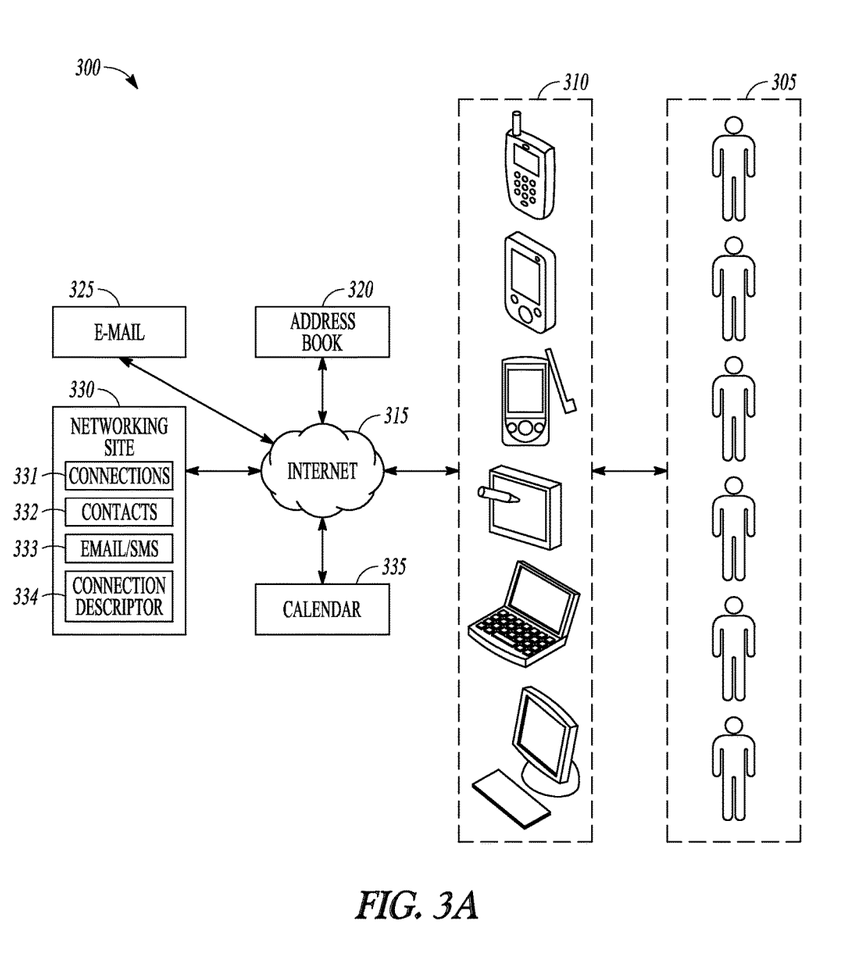
FIG. 3A is a block diagram illustrating a communication environment of networking connections, according to an example embodiment.
Figure 3B:
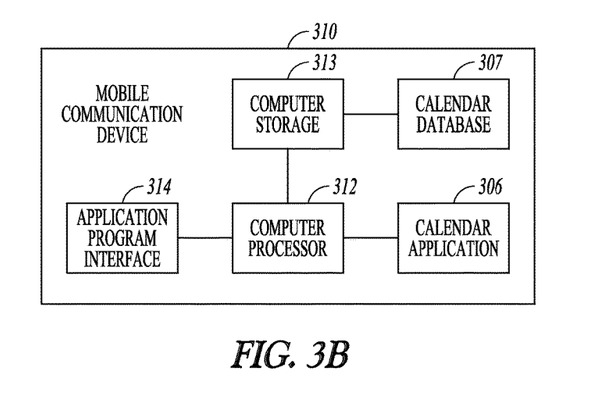
FIG. 3B is a block diagram of a mobile communication device that can be used in connection with the communication environment of FIG. 3.

The process 100 uses a mobile communication device, such as one of the mobile communication devices 310 illustrated in FIG. 3A. FIG. 3B illustrates that the mobile communications device 310 includes a computer processor 312 and computer storage 313. The computer processor 312 and computer storage 313 are configured with a calendar application 306 and calendar database 307. The mobile communications device 310 further includes an application program interface 314. The applications program interface 314 is coupled to the computer processor 312. One or more of the computer processor and the application program interface are configured to transmit requests and information to a social networking or business networking system 330, and to retrieve information from such social networking and business networking systems that complements information associated with the mobile communication device's calendar application and calendar database.

Specifically, at 105, an event is identified in the calendar database 307 that is associated with a first person. For example, the owner or user of the mobile communications device 310 may have an upcoming meeting with the first person as indicated in the calendar application 306 and database 307. At 110, a request is transmitted to one or more of a social network server and a business network server 330. The request includes an identification of the first person and an owner of the mobile communication device. The identification of the first person and the owner of the mobile communication device is used to access data in the social network server or business network server 330 that relates to the first person, the owner of the mobile communication device, and connections of the first person and the owner of the mobile communication device, and in particular, common connections between the first person and the owner of the mobile communication device. At 115, the mobile communication device 310 receives the data relating to the first person and the owner of the mobile communications device from the social network server and/or the business network server 330.

At 120, the information relating to the first person and the owner of the mobile communication device received from the social network server and/or the business network server 330 includes a list of connections 331 that the first person and the owner of the mobile communication device have in common, and/or a list of persons with whom the first person and the owner of the mobile communication device are both associated. The list of connections and associations informs the user of the mobile communication device 310 that the first person, with whom the user has an upcoming meeting or event, and the user have some people that they both know, such as a business colleague or a social contact. In an embodiment, to determine the associations that the first person and the user of the mobile communication device have in common, the social network server and/or the business network server can examine its social graph to determine common areas of interest such as attendance at the same university, working for the same company, and growing up in the same state. As noted at 125, the information relating to the first person and/or the owner of the mobile communication device received from the social network server and/or the business network server 330 includes personal information, a personal interest, a talking point, ice breaker information, or a topic for conversation. The user of the mobile communications device 310 can then use the connections and association information received from the social networking server or the business network server 330 to converse with the first person. For example, if the user and the first person both like the same professional sports team, then the user can be apprised of this and can discuss the team with the first person. Also, if the user and the first person both know a third person, the user and the first person can then become acquainted or further acquainted because of this common third person.

At 130, the upcoming event involving the user of the mobile communications device 310 and the first person are identified as a function of a calendar date, a time of day, a calendar date of the event, a time of the event, a location of the mobile communication device, and a location of the event. Consequently, when a user 305 of the mobile communication device 310 approaches the location and time of the upcoming event, his or her mobile communication device queries the social networking server or the business networking server 330 for information about the first person that the user 305 can use when meeting with the first person either before, during, or after the event or meeting.

At 135, the information relating to the first person and the owner of the mobile communication device includes a personal interest shared by the first person and the user of the mobile communication device. As noted at 140, the application programming interface 314 can be a software module that is downloaded onto the mobile communication device 310. In this embodiment, a user can later upgrade his or her mobile device so as to have this capability of coupling the calendar functions of the mobile communications device 310 with the social networking server or the business networking server 330. At 145, the calendar database 307 includes an identification of meetings, meeting participants, meeting locations, and companies associated with meeting participants.

At 150, the computer processor 312 in the mobile communications device 310 can store the information relating to the first person. Further, the mobile communication device 310 can also generate a periodic reminder of the availability of the information relating to the first person or the user of the mobile communication device. Of course this makes the application more flexible, since the user 305 can either review the information on the first person as soon as the mobile communications device 310 receives it, or the user 305 can review the information at a later or more convenient time.

FIGS. 2A and 2B are a flow chart like diagram that illustrates features and process steps of another embodiment of a mobile communications device 310 having a calendar application 306 and calendar database 307, and requesting and retrieving data about a first person from a social networking or a business networking system 330. At 205, an event is identified in the calendar database 307 that is associated with a first person. At 210, a request is transmitted to a social network server and/or a business network server 330. The request includes an identification of the first person and a user of the mobile communication device. As previously noted, the identification of the first person and the user of the mobile communication device is used to retrieve data about the first person and the user of the mobile communication device from the social networking server and/or the business networking server 330. At 215, the mobile communications device 310 receives from the social network server and/or the business network server 330 information relating to the first person and the user of the mobile communication device. At 220, an action indicator is received from the user 305 of the mobile communication device 310. The action indicator relates to displaying and storing the information relating to the first person. That is, in this embodiment, an action is required of the user 305 of the mobile communications device 310 to determine whether the information should be displayed to the user 305 or whether the information should be stored in the computer storage 313 of the mobile communications device 310 for later retrieval by the user 305.

At 230, the information relating to the first person and/or the user of the mobile communication device is a communication in context. A communication in context relates to a prior communication of the user or first person, and the context of that communication, such as the social networking server or business networking server 330 indicating that both the user and the first person participated in or attended the same conference last year. The communication can depend on several factors. Specifically, as indicated at 235, the communication in context can be a function of an analysis of a most recent communication between the first person and the user of the mobile communication device, an analysis of a most recent communication between the first person and a common connection of the user of the mobile communication device, and/or an an analysis of a most recent communication between the user of the mobile communication device and a common connection of the first person. At 240, the communication in context includes a new event, a new job, a promotion, a holiday, or a birthday.

At 245, the mobile communication device 310 includes a predetermined communication interval between the first person and the user of the mobile communication device. Further, in this embodiment, an amount of time since a previous communication between the first person and the user of the mobile communication device is determined. Then, responsive to the determining an amount of time since the previous communication between the first person and the user of the mobile communication device, the amount of time since the previous communication is compared with the predetermined communication interval, and a communication reminder is displayed on the mobile communications device 310 when the amount of time since the previous communication with the contact exceeds the communication interval. This feature basically reminds the user 305 that it has been a while since the user has communicated or corresponded with the first person.

At 250, the information received from the social network and/or the business network server 330 includes information selected as a function of a recency of communications between the first person and the user of the mobile communication device, or a recency of communications between the first person, user, and common connections. The selection process can use the social network server and/or the business network server 330.

At 255, the information relating to the first person and/or the user of the mobile communication device includes an interest in a hobby, a sport, or an activity, an attendance at one or more of a conference, a convention, a presentation, or a show, and an indication of one or more of an affinity toward and an interest to share a connection event including an entertainment event, a sporting event, a team event, a concert, and a performance. At 260, the information relating to the first person includes a photo of the first person and/or a profile of the first person.

At 265, the calendar database 307 that resides in the mobile communications device 310 includes agenda information, engagement information, or reminder information. The agenda information can include for example a calendar event, a holiday, a conference, a convention, a party, a commemorative event, and/or a meeting notice having a meeting header including a title, a location, and a time. The engagement information can include for example a birthday, a wedding, a party, and/or a special event. The reminder information can include for example a historical agenda item and an indication of an amount of time since a previous communication.

At 270, after an occurrence of the event, a density of communications between the first person and the user of the mobile communications device is monitored. That is, how often after the meeting do the user and first person communicate. At 275, timestamps corresponding to respective communications are acquired. At 280, a difference between successive timestamps is calculated. At 285, a communication interval between the first person and the user of the mobile communication device is determined. At 290, a communication reminder is displayed on the mobile communications device when the amount of time since a previous communication between the first person and the user of the mobile communication device exceeds the communication interval.

Environment

A general operating environment in which the above-disclosed provision of social context to calendar events is disclosed in FIGS. 3A and 3B, and example user interfaces are disclosed in FIGS. 4-10.

FIG. 3A is a block diagram illustrating a communication environment of networking contacts 300, according to an example embodiment. A large number of Internet users 305 may use a variety of electronic communications devices 310 to connect to the Internet 315 and maintain communication with other Internet users 305. Many of these devices 310 are mobile communication devices. Internet users 305 may in the course of their utilization of the Internet 315 end up maintaining contact information across a number of contact information sites on the Internet 315. Some of the contact information sites may include an address book provider 320, an e-mail provider 325, a networking site 330, a contacts aggregator (not shown), and a calendar provider 335. In an embodiment, the calendar provider 335 is independent of the calendar application 306 and the calendar database 307 that reside on the mobile communication device 310. The networking site 330 can be either socially oriented, business oriented, or both. Additionally, the networking site can include connections 331, contacts 332, an email or short messaging (SMS) functionality, and connection descriptors 334.

Interfaces

A daily agenda can be based on an aggregation of company information, calendar events, contacts, and daily engagement events across social network activity. The agenda view presents information about people and companies the user may be meeting with today or any other particular day. An attendee of the meeting may be displayed along with their contact information, and contact descriptors such as blogs that they participate in, their likes, and pursuits.

Figure 4:
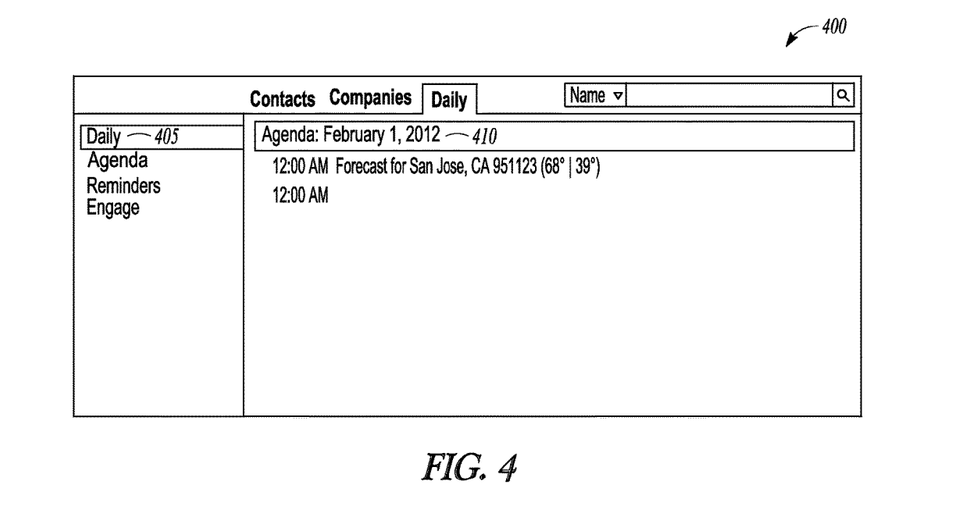
FIG. 4 is a diagrammatic representation of a daily connection information user interface, as may be used in an example embodiment.

FIG. 4 is a diagrammatic representation of a daily connection webpage 400, as may be used in an example embodiment. The daily connection webpage 400 includes a daily connections tab 405 that when selected displays a collection of agenda items 410 such as reminders, recent engagements, recent communications, and a further connection items in common with the user in the contact's displayed.

Figure 5:
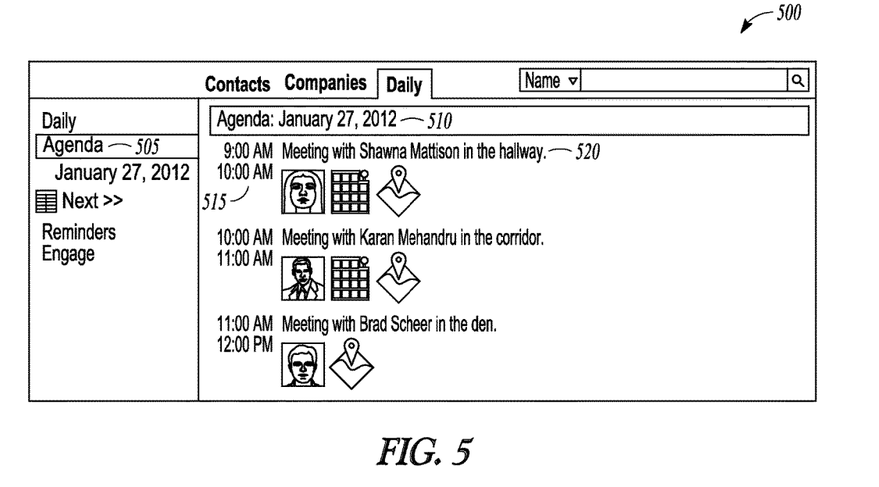
FIG. 5 is a diagrammatic representation of a daily agenda information user interface, according to an example embodiment.

FIG. 5 is a diagrammatic representation of a daily agenda webpage 500, according to an example embodiment. The daily agenda webpage 500 includes a daily agenda tab 505 that when selected produces a display of daily agenda items banner 510, which includes the day's date. Meeting and engagement information is displayed below the daily agenda items banner 510. Event details include a time range 515 and an engagement title 520. The engagement title 520 may also include subject details relating to the engagement.

Figure 6:
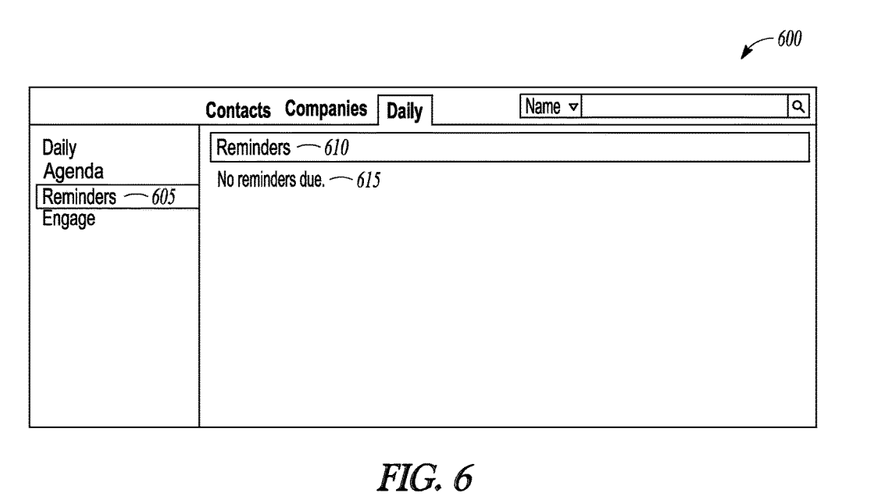
FIG. 6 is a diagrammatic representation of a daily reminders information user interface, as may be used in an example embodiment.

FIG. 6 is a diagrammatic representation of a daily reminders webpage 600, as may be used in an example embodiment. The daily reminders webpage 600 may include a daily reminders tab 605 that when selected causes the display of a reminders banner 610 under which a reminders listing 615 is presented.

Figure 7:
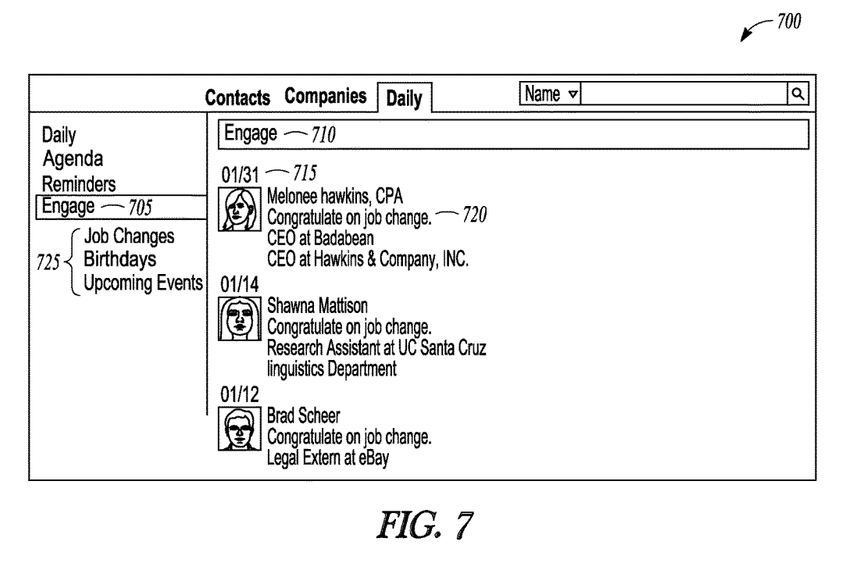
FIG. 7 is a diagrammatic representation of a daily engage information user interface, according to an example embodiment.

FIG. 7 is a diagrammatic representation of a daily engage webpage 700, according to example embodiment. The daily engage webpage 700 includes a daily engage tab 705 that when selected causes the display of an engage banner 710.

Displayed beneath the engage banner 710 is an engagement listing including an engagement date 715 and an engage connection link 720. Displayed beneath the engage tab 705 are different categories of engagements such as job changes, birthdays, and upcoming events (725). The engagement date 715 of FIG. 7 includes the job changes engagement.

Figure 8:
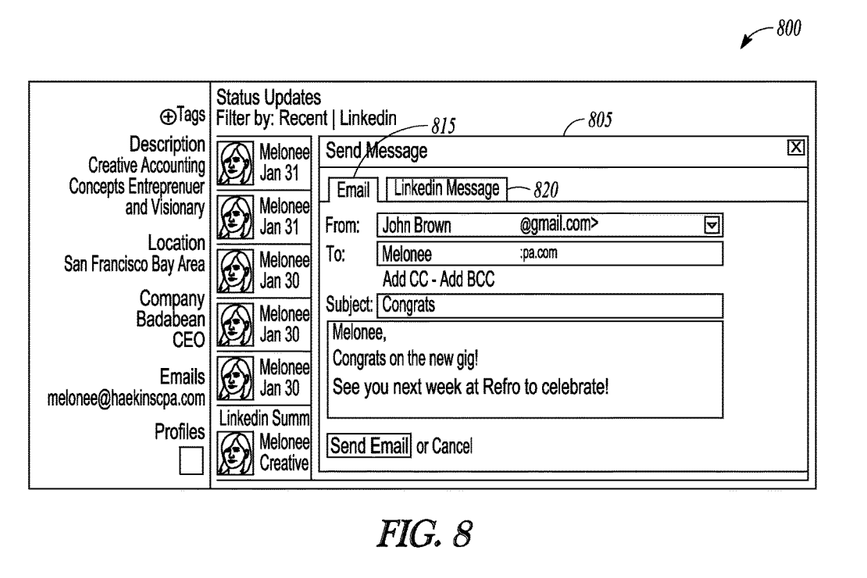
FIG. 8 is a diagrammatic representation of a daily engage congrats pop-up, according to an example embodiment.

FIG. 8 is a diagrammatic representation of a daily engage congrats pop-up 800, as may be used in an example embodiment. A send message pop-up 805 may be triggered in the daily engage congrats pop-up 800 when the engage connection link 720 is selected by the user. The pop-up presents an e-mail tab 815 and a social networking message tab 820. According to further networking sites linked to the online address book by the user 305, further alternative messaging and communication tabs may be available in the send message pop-up 805.

After a click-selection of the engage connection link 720, the contact's profile is displayed and the send message pop-up 805 is triggered with a congratulatory e-mail template prefilled out. The template is a standard congratulatory e-mail template which may be tailored for e-mail or social networking message communications. The user may add a communicative input in the form of a note to accompany the congratulatory template produced in the send message pop-up 805.

Figure 9:
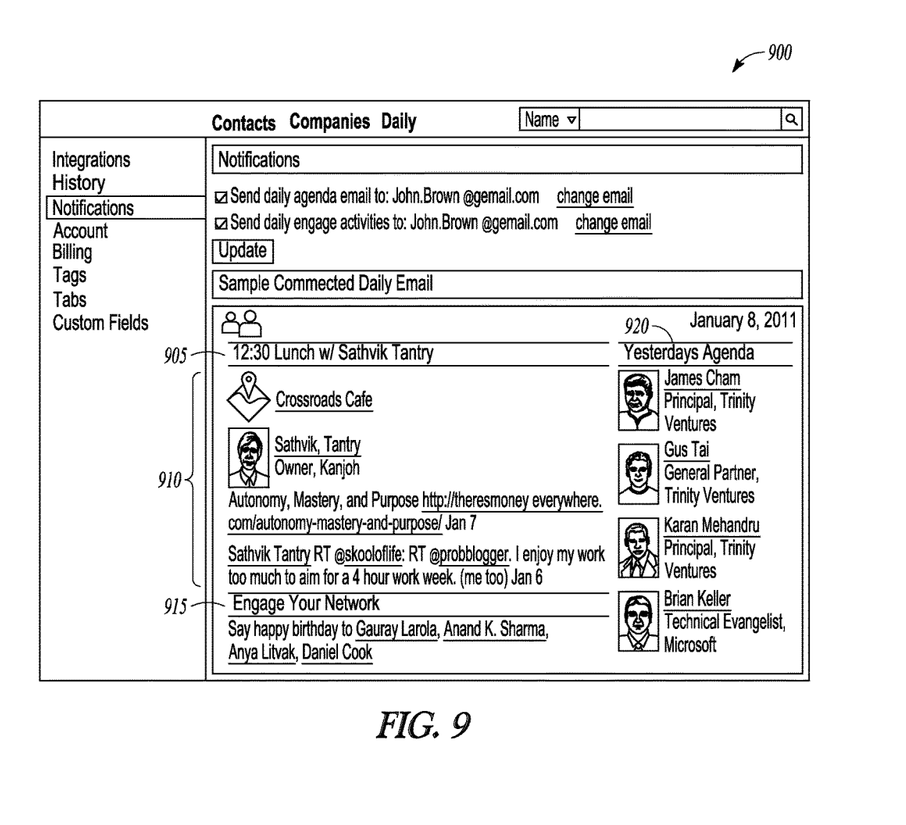
FIG. 9 is a diagrammatic representation of a daily e-mail of connection information, as may be used in an example embodiment.

FIG. 9 is a diagrammatic representation of a daily connection e-mail 900, according to example embodiment. The daily connection e-mail 900 includes agenda outlined entry 905 intermixed with a further connection items 910 including an event location (e.g., a restaurant or a café for a lunch engagement), recent communications by e-mail, meetings, and blog posts, for example. An engage view 915 may also be presented in the daily connection e-mail 900. In the engage view 915 contacts with birthdays may be listed along with links to their profile pages where a sent message pop-up 805 may be presented to send the selected contact a birthday congratulations message.

Yesterday's agenda 920 may also be presented. Yesterday's agenda 920 is a list of agenda items including network picture and profile snippets produced from yesterday's agenda items. Presentation of the list of these agenda items is intended to spark follow up action either through e-mail or the managing of notes taken in meetings.

Figure 10:
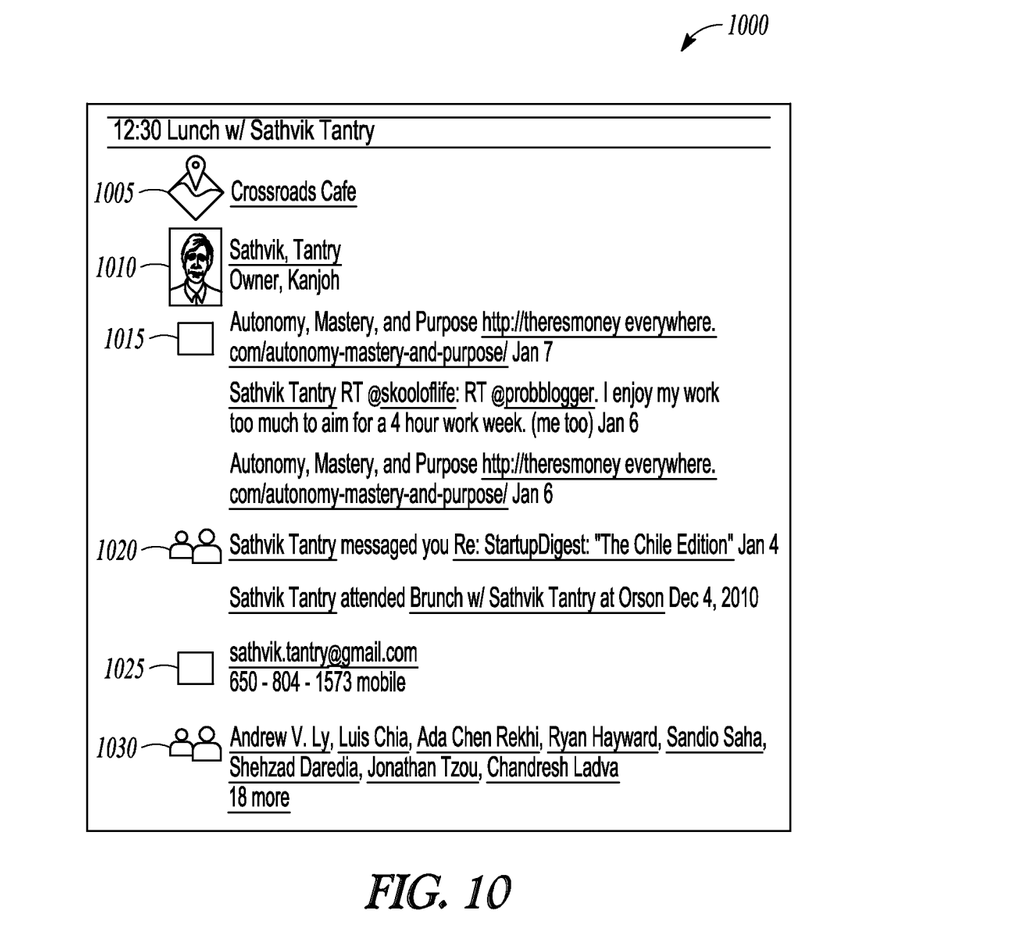
FIG. 10 is a diagrammatic representation of a further daily e-mail of connection information, according to an example embodiment.

FIG. 10 is a diagrammatic representation of a further daily connection e-mail 1000, according to example embodiment. The body of the daily connection e-mail 900 may present an event location 1005, an attendee 1010 including a profile snippet, their name, and a link to their profile. The e-mail body may also show general communications 1015 such as blog postings the attendee 1010 may have been placing with various networking sites including social networking sites, refreshable networking sites, and blog posting sites. The e-mail body may also include messages 1020 the user has exchanged with the attendee as well as meetings the attendee and user have attended. Contact information 1025 for the attendee 1010 may also be listed and may typically include an e-mail address and a phone number. The daily connection e-mail 900 may also include a listing of common contacts 1030 the attendee 1010 and the user have in common.

System

Figure 11:
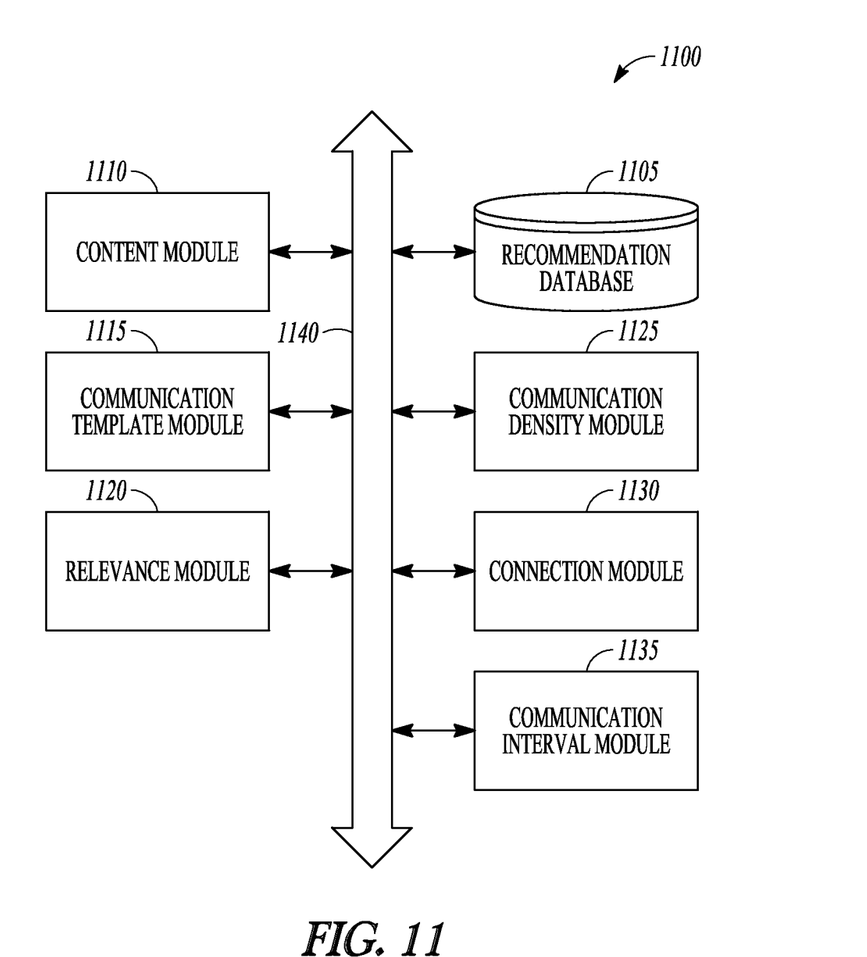
FIG. 11 is a block diagram illustrating online address book system modules, as may be used in an example embodiment.

FIG. 11 is a block diagram illustrating address book system and calendar system modules 1100, according to an example embodiment. The modules 1100 include a server (not shown) that includes at least one processing device configured to implement at least the respective address book and calendar processing modules listed herein. The modules 1100 include a computer memory storing a contact database 1105 that in turn includes such address book system elements as contact entries and the connection descriptors. Further modules included in the modules 1100 are a context module 1110 that may be configured to determine a context of a connection descriptor. A communication template module 1115 may be configured to determine a communication template type, including one of a communication channel type and a connection content type, according to a degree of recency.

The modules 1100 may also include a relevance module 1120 that may be configured to determine relevancy affiliated with contact information. A communication density module 1125 configured to monitor a communication density of communications to a contact and conducted according to a communication channel. A connection module configured 1130 to determine a connection threshold of a connection descriptor. A communication interval module 1135 configured to determine an amount of time since a previous communication. All of the modules 1100 are communicatively coupled through a data bus 1140 to one another.

Machine Architecture

Figure 12:
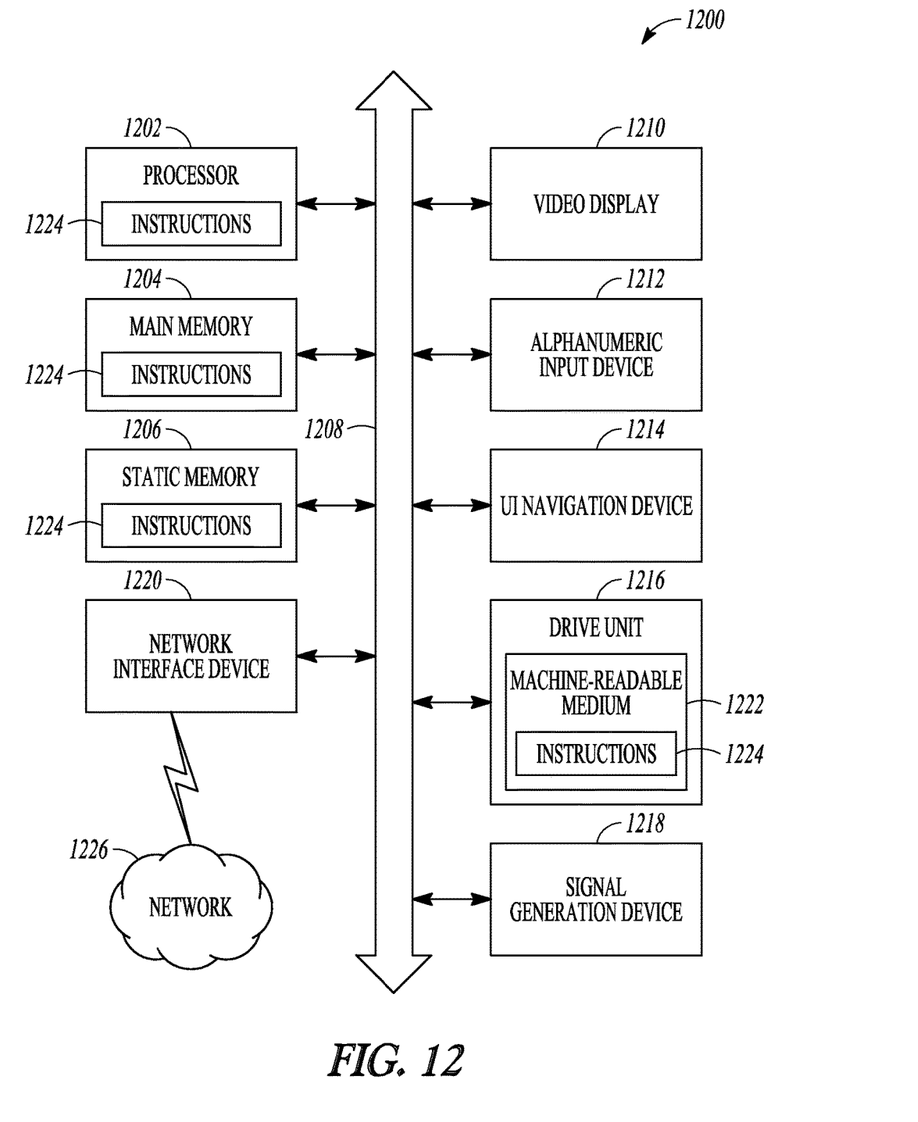
FIG. 12 is a block diagram of machine in the example form of a computer system within which a set instructions, for causing the machine to perform any one or more of the methodologies discussed herein, may be executed.

FIG. 12 is a block diagram of machine in the example form of a computer system 1200 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Although the present invention has been described with reference to specific example embodiments, it will be evident that various modifications and changes may be made to these embodiments without departing from the broader scope of the invention. Accordingly, the specification and drawings are to be regarded in an illustrative rather than a restrictive sense.

Plural instances may be provided for components, operations, or structures described herein as a single instance. Finally, boundaries between various components, operations, and data stores may be somewhat arbitrary, and particular operations may be illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A mobile communication device comprising:
    a computer processor configured with a calendar application and calendar database; and
    an application programming interface coupled to the computer processor;
    wherein one or more of the computer processor and the application programming interface are configured to:
        identify an event in the calendar database that is associated with a first person;

transmit a request to one or more of a social network server and a business network server, the request comprising an identification of the first person and a user of the mobile communication device; and receive from one or more of the social network server and the business network server information relating to the first person and the user of the mobile communication device;

wherein the first person and the user of the mobile communication device are scheduled for the event;

wherein the event is identified as a function of a calendar date, a time of day, a calendar date of the event, a time of the event, a location of the mobile communication device, and a location of the event;

wherein the computer processor is configured to trigger the transmit of the request to the social network server or the business network server when the calendar date equals the calendar date of the event, the time of day approaches the time of the event, and the location of the mobile communication device approaches the location of the event;

wherein the calendar database comprises one or more upcoming events for the user of the mobile communication device; and wherein the social network server and the business network server comprise common connections derived from a social graph between the first person and the user of the mobile communications device.

2. The mobile communication device of claim 1, wherein the information relating to the first person and the user of the mobile communication device received from one or more of the social network server and the business network server is determined via a use of a social graph and comprises one or more of a list of persons to whom the first person and the user of the mobile communication device are both connected and a list of persons with whom the first person and the user of the mobile communication device are both associated.

3. The mobile communication device of claim 1, wherein the information relating to the first person and the user of the mobile communication device received from one or more of the social network server and the business network server comprises one or more of personal information, a personal interest, a talking point, ice breaker information, and a topic for conversation.

4. The mobile communication device of claim 1, wherein the information relating to the first person and the user of the mobile communication device comprises a personal interest shared by the first person and the user of the mobile communication device.

5. The mobile communication device of claim 1, wherein the application programming interface comprises a software module that is downloaded onto the mobile communication device.

6. The mobile communication device of claim 1, wherein the calendar database comprises one or more of an identification of meetings, meeting participants, meeting locations, and companies associated with meeting participants.

7. The mobile communication device of claim 1, wherein the computer processor is configured to store in the mobile communication device the information relating to the first person or the user of the mobile communication device; and to generate a periodic reminder of the availability of the information relating to the first person or the user of the mobile communication device.

8. A mobile communication device comprising:
a computer processor configured with a calendar application and a calendar database; and
an application programming interface coupled to the computer processor;
wherein one or more of the computer processor and the application programming interface are configured to:
identify an event in the calendar database that is associated with a first person;
transmit a request to one or more of a social network server and a business network server, the request comprising an identification of the first person and a user of the mobile communication device;
receive from one or more of the social network server and the business network server information relating to the first person and the user of the mobile communication device; and
receive an action indicator from the user of the mobile communication device such that the action is required to determine whether to display or store the information relating to the first person and the information relating to the user of the mobile communication device;
wherein the first person and the user of the mobile communication device are scheduled for the event;
wherein the computer processor is configured to trigger transmission of the request to the social network server or the business network server when a calendar date equals a calendar date of the event, a time of day approaches a time of the event, and a location of the mobile communication device approaches a location of the event;
wherein the calendar database comprises one or more upcoming events for the user of the mobile communication device; and
wherein the social network server and the business network server comprise common connections derived from a social graph between the first person and the user of the mobile communications device.

9. The mobile communication device of claim 8, wherein the information relating to one or more of the first person and the user of the mobile communication device comprises a communication in context.

10. The mobile communication device of claim 9, wherein the communication in context is a function of an analysis of a most recent communication between the first person and the user of the mobile communication device, an analysis of a most recent communication between the first person and a connection common to the first person and the user of the mobile communication device, or an analysis of a most recent communication between the user of the mobile communication device and a connection common to the first person and the user of the mobile communication device.

11. The mobile communication device of claim 10, wherein the communication in context comprises one or more of a news event, a new job, a promotion, a holiday, and a birthday.

12. The mobile communication device of claim 8, comprising:
a predetermined communication interval between the first person and the user of the mobile communication device;
wherein the computer processor is configured to:
determine an amount of time since a previous communication between the first person and the user of the mobile communication device;
responsive to the determining an amount of time since the previous communication, compare an amount of time since the previous communication with the predetermined communication interval; and display on the mobile communication device a communication reminder when the amount of time since the previous communication exceeds the predetermined communication interval.

13. The mobile communication device of claim 8, wherein the information relating to the first person or the user of the mobile communication device received from one or more of the social network server and the business network server comprises information selected as a function of a recency of communications between the first person and a connection or information selected as a function of a recency of communication between the user of the mobile device and a connection, the selection of the information using one or more of the social network server and the business network server.

14. The mobile communication device of claim 8, wherein the information relating to the first person or the user of the mobile communication device comprises one or more of:
an interest in one or more of a hobby, a sport, and an activity;
an attendance at one or more of a conference, a convention, a presentation, and a show; and
an indication of one or more of an affinity toward and an interest to share a connection event including one or more of an entertainment event, a sporting event, a team event, a concert, and a performance.

15. The mobile communication device of claim 8, wherein the information relating to the first person comprises one or more of a photo of the first person and a profile of the first person.

16. The mobile communication device of claim 8, wherein the calendar database comprises one or more of:
agenda information, engagement information, and reminder information;
wherein the agenda information includes one or more of a calendar event, a holiday, a conference, a convention, a party, a commemorative event, and a meeting notice having a meeting header including a title, a location, and a time;
the engagement information includes one or more of a birthday, a wedding, a party, and a special event, and
the reminder information includes one or more of a historical agenda item and an indication of an amount of time since a previous communication.

17. The mobile communication device of claim 8, wherein the computer processor is configured to:
after an occurrence of the event, monitor a density of communications between the first person and the user of the mobile communication device;
acquire timestamps corresponding to respective communications;
calculate a difference between successive timestamps;
determine a communication interval between the first person and the user of the mobile communication device; and
display on the mobile communication device a communication reminder when the amount of time since a previous communication between the first person and the user of the mobile communication device exceeds the communication interval.

18. A method comprising:
identifying an event that is associated with a first person, wherein the event is stored in a calendar database on a mobile communication device;
transmitting a request, using an application programming interface on the mobile communication device, to one or more of a social network server and a business network server, the request comprising an identification of the first person and a user of the mobile communication device;
receiving at the mobile communication device, from one or more of the social network server and the business network server, information relating to the first person and the user of the mobile communication device;
identifying the event as a function of a calendar date, a time of day, a calendar date of the event, a time of the event, a location of the mobile communication device, and a location of the event; and
triggering the transmitting of the request to the social network server or the business network server when the calendar date equals the calendar date of the event, the time of day approaches the time of the event, and the location of the mobile communication device approaches the location of the event;
wherein the first person and the user of the mobile communication device are scheduled for the event;
wherein the calendar database comprises one or more upcoming events for the user of the mobile communication device; and
wherein the social network server and the business network server comprise common connections derived from a social graph between the first person on the user of the mobile communications device.

19. The method of claim 18, comprising receiving at the mobile communication device an action indicator from the user of the mobile communication device, the action indicator relating to one or more of displaying and storing the information relating to the first person and the user of the mobile communication device.

20. The method of claim 18, wherein the information relating to the first person and the user of the mobile communication device received from one or more of the social network server and the business network server comprises a list of persons to whom the first person and the user of the mobile communication device are both connected and a list of persons with whom the first person and the user of the mobile communication device are associated.

21. The method of claim 18, wherein the information relating to the first person and the user of the mobile communication device comprises a personal interest shared by the first person and the user of the mobile communication device.

* * * * *